(12) United States Patent
Wang et al.

(10) Patent No.: US 8,101,313 B2
(45) Date of Patent: Jan. 24, 2012

(54) FLOW FIELD PLATE MODULE FOR FUEL CELL SYSTEM

(75) Inventors: Cheng Wang, Hsinchu (TW); Jin-Shu Huang, Hsinchu (TW); Ching-Po Lee, Hsinchu (TW); Nien-Hui Hsu, Hsinchu (TW)

(73) Assignee: Young Green Energy Co., Hsinchu County (TW)

( * ) Notice: Subject to any disclaimer, the term of this patent is extended or adjusted under 35 U.S.C. 154(b) by 1152 days.

(21) Appl. No.: 11/905,212

(22) Filed: Sep. 28, 2007

(65) Prior Publication Data
US 2008/0226963 A1 Sep. 18, 2008

(30) Foreign Application Priority Data
Mar. 16, 2007 (TW) .............................. 96109164 A

(51) Int. Cl.
*H01M 8/24* (2006.01)
*H01M 8/04* (2006.01)
(52) U.S. Cl. ........ 429/457; 429/456; 429/454; 429/512; 429/513
(58) Field of Classification Search .................. 429/457, 429/456, 454, 512, 513
See application file for complete search history.

(56) References Cited

U.S. PATENT DOCUMENTS
2004/0137299 A1* 7/2004 Mazza et al. ..................... 429/34
2005/0069749 A1* 3/2005 Frank et al. ..................... 429/38

FOREIGN PATENT DOCUMENTS
TW M306722 2/2007

OTHER PUBLICATIONS
The office action for the corresponding Taiwanese patent application No. 96109164, issued on Sep. 16, 2010, 3 pages.

* cited by examiner

*Primary Examiner* — Helen O Conley
(74) *Attorney, Agent, or Firm* — Bacon & Thomas, PLLC

(57) ABSTRACT

A flow field plate module for a fuel cell system includes at least one flow field plate defining a fuel transporting channel thereon. The fuel transporting channel is divided into a middle converging zone having a group of first flow guiding plates arranged therein, and two diverging zones located at two lateral sides of the middle converging zone and each having a group of second flow guiding plates arranged therein. The second flow guiding plates are symmetrically arranged in the two diverging zones and are directed at respective inner end toward a space between two adjacent first flow guiding plates in the middle converging zone to thereby offset from each of the two adjacent first flow guiding plates by a predetermined distance in a fuel flowing direction, so that a fluid path is formed between any two adjacent first and second flow guiding plates.

11 Claims, 6 Drawing Sheets

FLOW FIELD PLATE MODULE FOR FUEL CELL SYSTEM

FIELD OF THE INVENTION

The present invention relates to a fuel cell, and more particularly, to a flow field plate module for a fuel cell system.

BACKGROUND OF THE INVENTION

A fuel cell system is a power-generating device that generates electrical energy through electrochemical reaction of hydrogen-containing fuel with air. Since it has the advantages of low pollution, low noise, and high efficiency, the fuel cell system is an energy technique meeting nowadays requirements. Among various fuel cell systems, the proton exchange membrane fuel cell (PEMFC) and the direct methanol fuel cell (DMFC) are the two most common fuel cell systems.

Please refer to FIG. 1 that shows a conventional flow field plate module 1 for a fuel cell system. As shown, the flow field plate module 1 includes a membrane electrode assembly (MEA) 11, and an anode flow field plate 12 and a cathode flow field plate 13 separately located at two opposite outer sides of the MEA 11. The MEA 11 consists of a proton exchange membrane (PEM), an anode catalyst layer 112, a cathode catalyst layer 113, an anode gas diffusion layer (GDL) 114, and a cathode gas diffusion layer 115. The anode flow field plate 12 and the cathode flow field plate 13 are normally made of graphite, and are provided on respective inner side surface with flow channels 121, 131, through which reactants flow.

To pump methanol-water solution through the flow channels 121 on the anode flow field plate 12 to react with the anode catalyst layer 112 in the MEA 11, good flow channel design is needed to enable uniform reaction of the methanol-water solution with the anode catalyst layer 112. In addition, since anode product, such as carbon dioxide, is produced in the reaction of the methanol-water solution with the anode catalyst, the flow channel of the anode flow field plate designed must also be capable of successfully discharging the anode product.

The conventional flow channels on the anode flow field plate may be differently designed. FIG. 2 shows a serpentine flow channel design, and FIG. 3 shows a parallel channel design. In the serpentine flow channel design, a continuously winding path, i.e. a serpentine flow channel 121a, is provided on the anode flow field plate 12. The serpentine flow channel 121a is communicably connected at an end to an anode fuel inlet 14, and at the other end to an anode fuel outlet 15. In the parallel flow channel design, a plurality of parallelly connected paths, or flow channels 121b, are provided on the anode flow field plate 12. One common end of the plurality of parallel flow channels 121b is communicably connected to an anode fuel inlet 14, and another common end of the plurality of parallel flow channels 121b is communicably connected to an anode fuel outlet 15.

Both the serpentine and the parallel flow channel design achieve the purpose of transporting fluid, that is, the methanol-water solution. However, these two types of flow channel design have respective disadvantages. For example, the serpentine flow channel 121a is relatively long to cause excessively large pressure loss in the course of transporting the fluid in the direction as indicated by the arrows in FIG. 2. Therefore, a pump providing a relative high pressure is needed to drive the methanol-water solution to flow through the serpentine flow channel 121a. Moreover, the methanol-water solution at the upstream of the serpentine flow channel 121a reacts at the anode catalyst before it flows to the downstream. The methanol-water solution at the downstream of the serpentine flow channel 121a therefore has a concentration lower than that of the solution at the upstream. That is, the serpentine flow channel 121a has the problem of changing methanol concentration diminishingly from the upstream to the downstream.

On the other hand, while the parallel flow channel design overcomes the problem of changing methanol concentration between the upstream and the downstream serpentine flow channel, another problem with non-uniformly distributed flow in the parallelly arranged flow channels 121b is found. When the produced carbon dioxide accumulates in the flow channels, increased flow resistance is produced in the flow channels. Since the fuel tends to flow toward flow channels 121b that have somewhat lower flow resistance, it is difficult to discharge the produced carbon dioxide.

SUMMARY OF THE INVENTION

An object of the present invention is to provide a flow field plate module for a fuel cell system that includes at least one flow field plate defining a fuel transporting channel thereon. In the fuel transporting channel, a first and two second flow guide groups are provided to form a good flow field, enabling the anode fuel to be uniformly distributed in the fuel transporting channel.

Another object of the present invention is to provide a flow field plate module for a fuel cell system, in which first and second flow guide groups are arranged to enable uniform fuel concentration in different areas of the flow field plate.

A further object of the present invention is to provide a flow field plate module for a fuel cell system, in which a plurality of flow guiding plates are symmetrically arranged to enable fuel flowing through the flow field plate to uniformly distribute in all flow channels formed on the flow field plate.

To achieve the objectives mentioned above, in accordance with an preferred embodiment of the present invention, a flow field plate module for a fuel cell system comprises at least a flow field plate, the flow field plate comprises a main body, a first flow guide group and two second flow guide groups. The main body has a fuel-in wall provided with a fuel inlet, a fuel-out wall provided with a fuel outlet, and two corresponding side walls, which together define a fuel transporting channel in the main body. The fuel transporting channel is divided into a middle converging zone and two diverging zones separately located at two lateral sides of the middle converging zone. The fuel inlet and the fuel outlet are provided in the middle converging zone, such that fuel introduced into the fuel transporting channel via the fuel inlet flows in a first flowing direction before being discharged from the main body via the fuel outlet. The first flow guide group includes a plurality of first flow guiding plates arranged in the middle converging zone to space from one another in the first flowing direction. The two second flow guide groups are arranged in the two diverging zones at two opposite sides of the first flow guide group, each of the second flow guide groups includes at least one second flow guiding plate. Each of the second flow guiding plates is directed at an inner end toward a space between two adjacent first flow guiding plates in the middle converging zone to thereby offset from each of the two adjacent first flow guiding plates by a predetermined distance, allowing a fluid path to be formed between any two adjacent first and second flow guiding plates. When the fuel is introduced into the fuel transporting channel via the fuel inlet, the fuel is repeatedly guided by the first flow guiding plates toward the two diverging zones to form two branch flows, which are then guided by the laterally corresponding second flow guiding plates to flow toward the middle converging zone via the offset distance and form a main flow again; and the diverging and converging of the fuel repeats until the fuel is finally guided to the fuel outlet and discharged from the main body.

The present invention effectively overcomes the problem of an excessively long flow channel existed in the conventional serpentine flow channel design for the fuel cell flow field plate, and accordingly, enables reduced pressure loss in the course of transporting a fluid fuel. The present invention also effectively solves the problem of non-uniform concentration of methanol-water solution existed in the serpentine flow channel by arranging a plurality of flow guiding plates in the flow transporting channel on the flow field plate of the present invention. The present invention also overcomes the problem of non-uniform distribution of fuel flow existed in the conventional parallel flow channel design, and improves the discharge of carbon dioxide, which is the anode reaction product produced in the fuel cell.

Other objectives, features and advantages of the present invention will be further understood from the further technological features disclosed by the embodiments of the present invention wherein there are shown and described preferred embodiments of this invention, simply by way of illustration of modes best suited to carry out the invention

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," and variations thereof herein are used broadly and encompass direct and indirect connections, couplings, and mountings. Similarly, "adjacent to" and variations thereof herein are used broadly and encompass directly and indirectly "adjacent to". Therefore, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
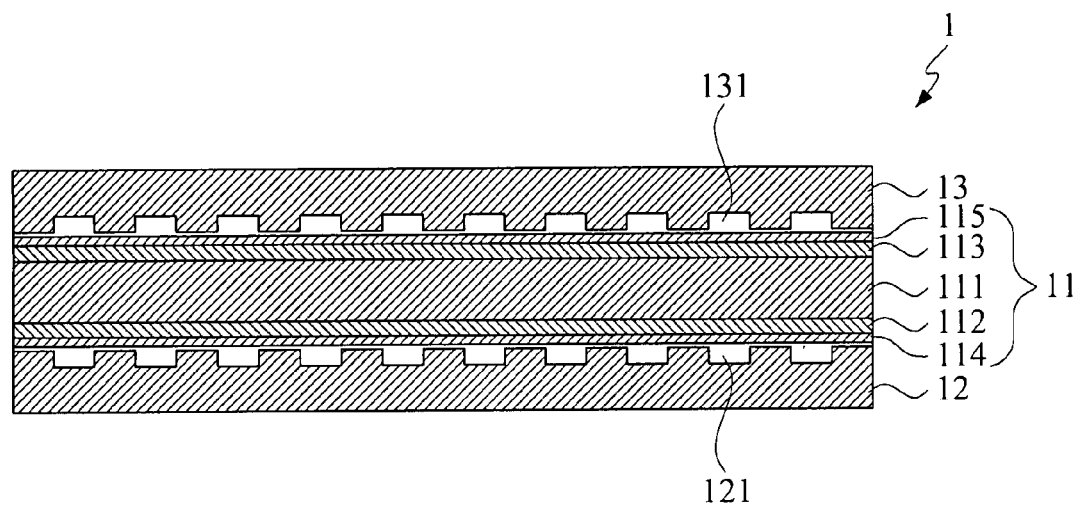
FIG. 1 is a sectional view showing the structure of a conventional fuel cell system.
Figure 2:
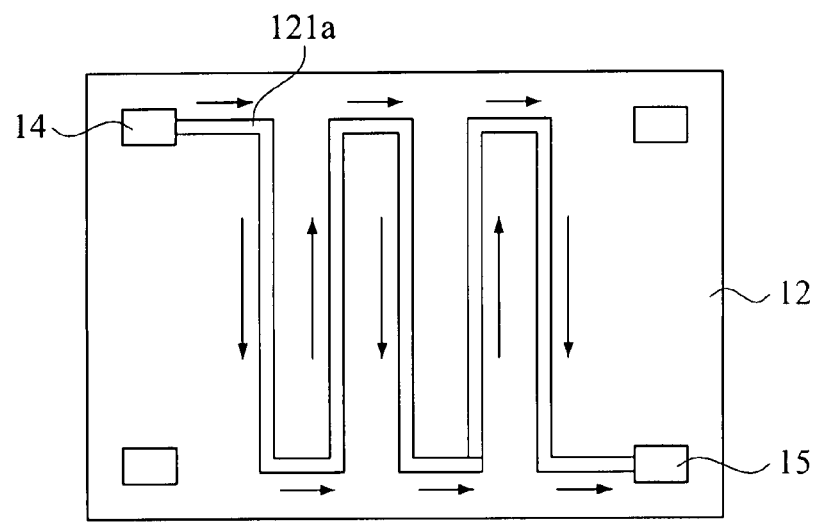
FIG. 2 is a schematic view of a conventional anode flow field plate provided with a serpentine flow channel.
Figure 3:
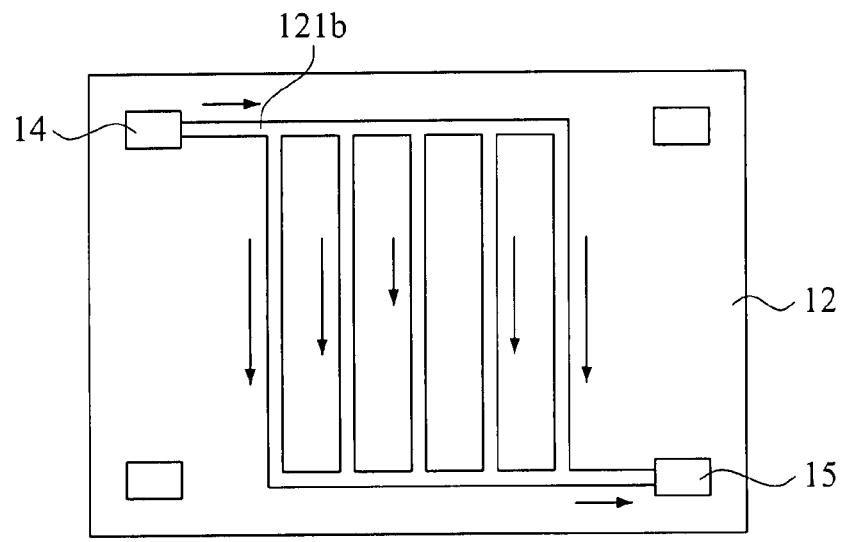
FIG. 3 is a schematic view of a conventional anode flow field plate provided with parallel flow channels.
Figure 4:
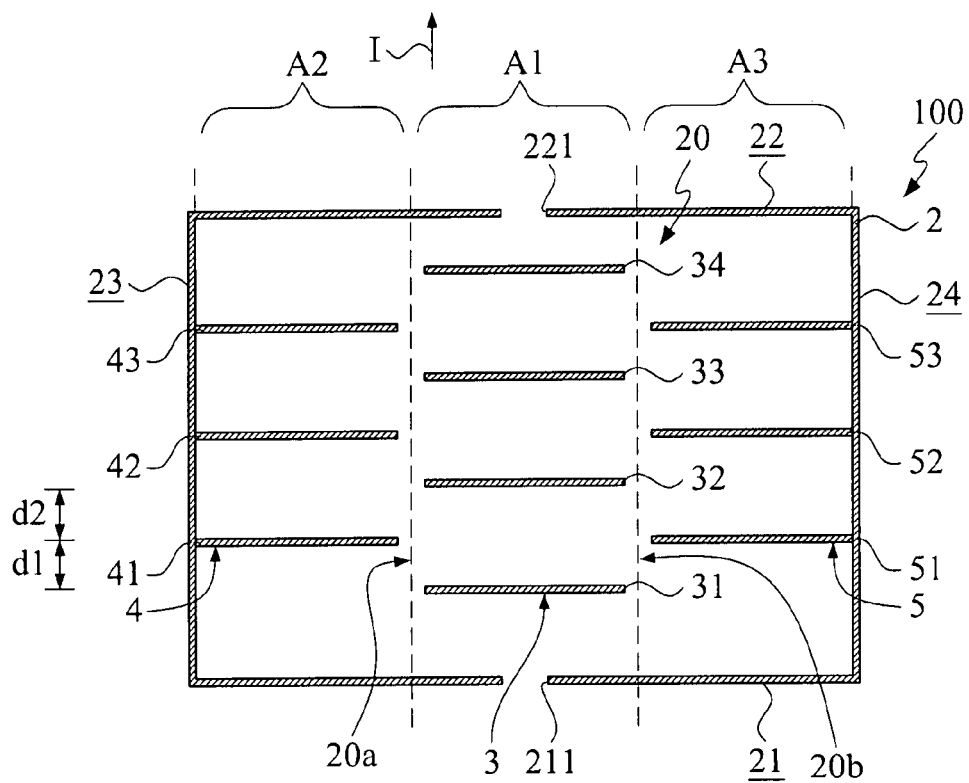
FIG. 4 is a schematic view of a flow field plate module for a fuel cell system according to a first embodiment of the present invention.

Please refer to FIG. 4, according to a first embodiment of the present invention, a flow field plate module for a fuel cell system comprises a flow field plate 100. As shown, the flow field plate 100 includes a main body 2, a first flow guide group 3, and two second flow guide groups 4, 5. The main body 2 has a fuel-in wall 21, a fuel-out wall 22, and two corresponding side walls 23, 24, which together define a fuel transporting channel 20 in the main body 2.

The fuel-in wall 21 is provided with a fuel inlet 211, and the fuel-out wall 22 is provided with a fuel outlet 221. In the illustrated first embodiment, a direct methanol fuel cell (DMFC) is exemplified, and a methanol-water solution is used as an anode fuel Fin; and the flow field plate 100 is an anode flow field plate provided with flow channels for transporting the methanol-water solution.

The fuel transporting channel 20 is divided into a middle converging zone A1, and two diverging zones A2, A3 separately located at two lateral sides of the middle converging zone A1. More specifically, the diverging zone A2 is located between the middle converging zone A1 and the side wall 23, and the diverging zone A3 is located between the middle converging zone A1 and the side wall 24. The fuel inlet 211 and the fuel outlet 221 are located at two opposite ends of the middle converging zone A1. The anode fuel is introduced into the fuel transporting channel 20 via the fuel inlet 211 to flow toward and be discharged via the fuel outlet 221 in a first flowing direction I.

The first flow guide group 3 is arranged within the middle converging zone A1, and comprises a plurality of first flow guiding plates 31, 32, 33, 34, which are in the form of flat partition plates and sequentially spaced along the first flowing direction I to be parallel with one another in lengthwise direction and perpendicular to the first flowing direction I.

The second flow guide groups 4, 5 are correspondingly arranged in the two diverging zones A2, A3 at two lateral sides of the first flow guide group 3. The second flow guide group 4 comprises at least one left second flow guiding plate, in this embodiment, there are three left second flow guiding plates 41, 42, 43, which are spaced along the first flowing direction I within the diverging zone A2 of the fuel transporting channel 20. Similarly, the second flow guide group 5 comprises at least one right second flow guiding plate, in this embodiment, there are three right second flow guiding plates 51, 52, 53, which are spaced along the first flowing direction I within the diverging zone A3 of the fuel transporting channel 20. The left second flow guiding plates 41, 42, 43 and the right second flow guiding plates 51, 52, 53 are flat partition plates laterally symmetrically arranged relative to the middle converging zone A1. More specifically, the left second flow guiding plate 41 is located corresponding to the right second flow guiding plate 51, the left second flow guiding plate 42 is located corresponding to the right second flow guiding plate 52, and the left second flow guiding plate 43 is located corresponding to the right second flow guiding plate 53. All the left second flow guiding plates 41, 42, 43 in the second flow guide group 4 and the right second flow guiding plates 51, 52, 53 in the second flow guide group 5 are parallel with one another in the lengthwise direction and perpendicular to the first flowing direction I.

Each of the left second flow guiding plates 41, 42, 43 in the second flow guide group 4 is connected at respective outer end to the side wall 23, and with respective inner end offset from two adjacent first flow guiding plates 31, 32, 33, 34 by a predetermined distance in the first flowing direction I, such as the left second flow guiding plate 41 is offset from the first flow guiding plates 31, 32 by distances d1, d2, respectively, so that a fluid path 20a is formed between any two adjacent first flow guiding plates and left second flow guiding plate. Similarly, each of the right second flow guiding plates 51, 52, 53 in the second flow guide group 5 is connected at respective outer end to the side wall 24, and with respective inner end offset from the first flow guiding plates 31, 32, 33, 34 by a predetermined distance in the first flowing direction I, such as the right second flow guiding plate 51 is offset from the first flow guiding plates 31, 32 by distances d1, d2, respectively, so that a fluid path 20b is formed between any two adjacent first flow guiding plates and right second flow guiding plate.

Figure 5:
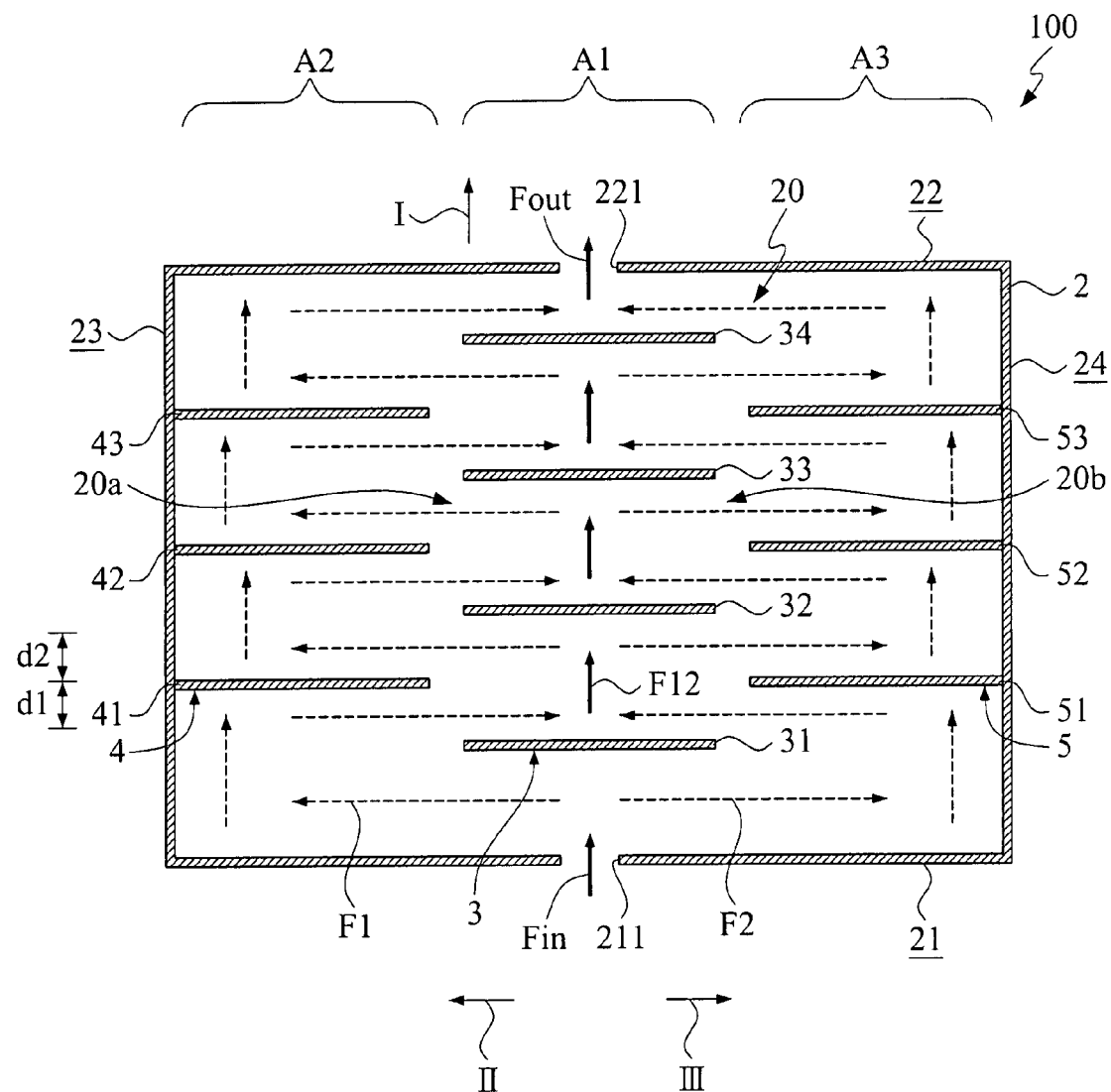
FIG. 5 is a schematic view showing the anode fuel flow field formed on the flow field plate module for a fuel cell system of FIG. 4.

Please refer to FIG. 5. When the anode fuel Fin is introduced into the fuel transporting channel 20 via the fuel inlet 211 to flow in the first flowing direction I and reach the first flow guiding plate 31, the anode fuel Fin is caused to flow in two opposite flowing directions II and III toward the two diverging zones A2, A3 and forms two branch flows F1, F2, which are respectively guided by the second flow guiding plates 41, 51 to flow through the fluid paths 20a, 20b to converge in the middle converging zone A1 again and form a main flow F12. The main flow F12 keeps flowing forward and is repeatedly diverged and converged at subsequent staggered first flow guiding plates 32, 33, 34 and second flow guiding plates (42, 52) & (43, 53). The main flow F12 is finally guided through the fuel outlet 221 and discharged as an anode fuel Fout.

Figure 6:
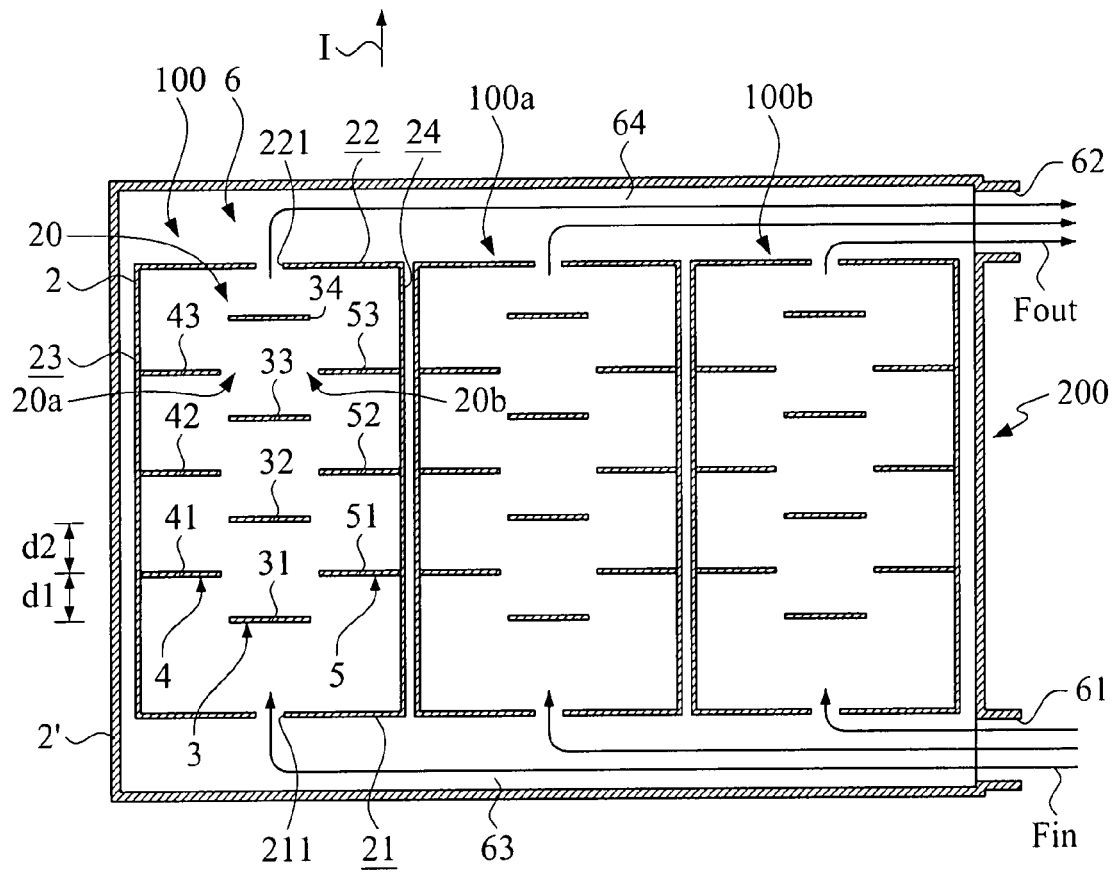
FIG. 6 is a schematic view of a flow field plate module for a fuel cell system according to a second embodiment of the present invention.

Please refer to FIG. 6, according to a second embodiment of the present invention, a flow field plate module for a fuel cell system comprises an integrated flow field plate 200 having an outer frame 2', and a plurality of flow field plates 100, 100a, 100b arranged in the outer frame 2' of the integrated flow field plate 200. The plurality of flow field plates 100, 100a, 100b are arranged side by side to space from one another in a direction perpendicular to the first flowing direction I, and are structurally similar to the flow field plate 100 in the first embodiment. The integrated flow field plate 200 internally forms a common fuel transporting channel 6, and is provided with a common fuel inlet 61 and a common fuel outlet 62. The common fuel transporting channel 6 internally includes a fuel-in path 63 and a fuel-out path 64.

Each of the flow field plates 100, 100a, 100b forms an independent flow channel structure, and they are arranged side by side to together produce a flow field. The fuel inlets 211 of the independent flow field plates 100, 100a, 100b are in communication with the fuel-in path 63, and the fuel outlets 221 of the independent flow field plates 100, 100a, 100b are in communication with the fuel-out path 64. With these arrangements, an even more uniform flow field distribution is obtained on the integrated flow field plate 200, and the difference in the concentrations of the anode catalyst among different areas in the integrated flow field plate 200 is reduced.

When the anode fuel Fin is supplied into the fuel-in path 63 of the common fuel transporting channel 6 via the common fuel inlet 61 of the integrated flow field plate 200, the anode fuel Fin flows into the fuel transporting channels 20 of the flow field plates 100, 100a, 100b via the fuel inlets 211 thereof, and then flows through the fuel transporting channels 20 and the fuel outlets 221 into the fuel-out path 64 of the common fuel transporting channel 6, and is finally discharged from the integrated flow field plate 200 via the common fuel outlet 62.

Figure 7:
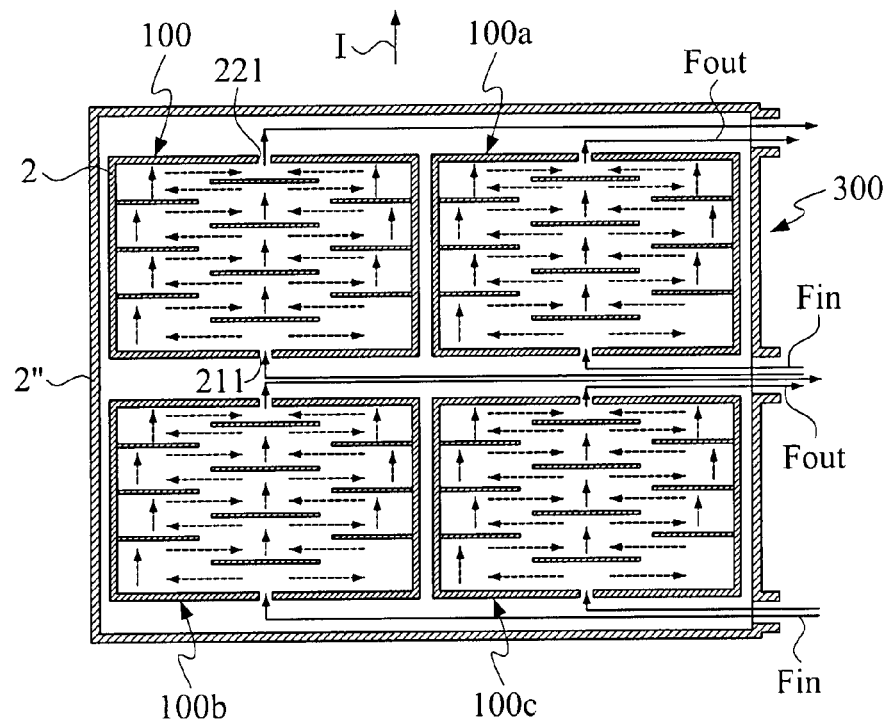
FIG. 7 is a schematic view of a flow field plate module for a fuel cell system according to a third embodiment of the present invention.

In FIG. 7, according to a third embodiment of the present invention, a flow field plate module for a fuel cell system includes an integrated flow field plate 300 having an outer frame 2", and a plurality of flow field plates 100, 100a, 100b, 100c arranged inside the outer frame 2" as a rectangular matrix, such as a 2×2 matrix, so that the flow field plates 100, 100a, 100b, 100c are spaced in a direction perpendicular to the first flowing direction I. The flow field plates 100, 100a, 100b, 100c are structurally similar to the flow field plates 100 in the first embodiment, and each forms an independent flow channel structure. The flow field plates 100, 100a, 100b, 100c arranged as a rectangular matrix therefore together form an integrated flow field plate 300 that enables a uniform flow field distribution thereon and reduces the differences of the anode fuel concentration among different areas of the anode catalyst.

Figure 8:
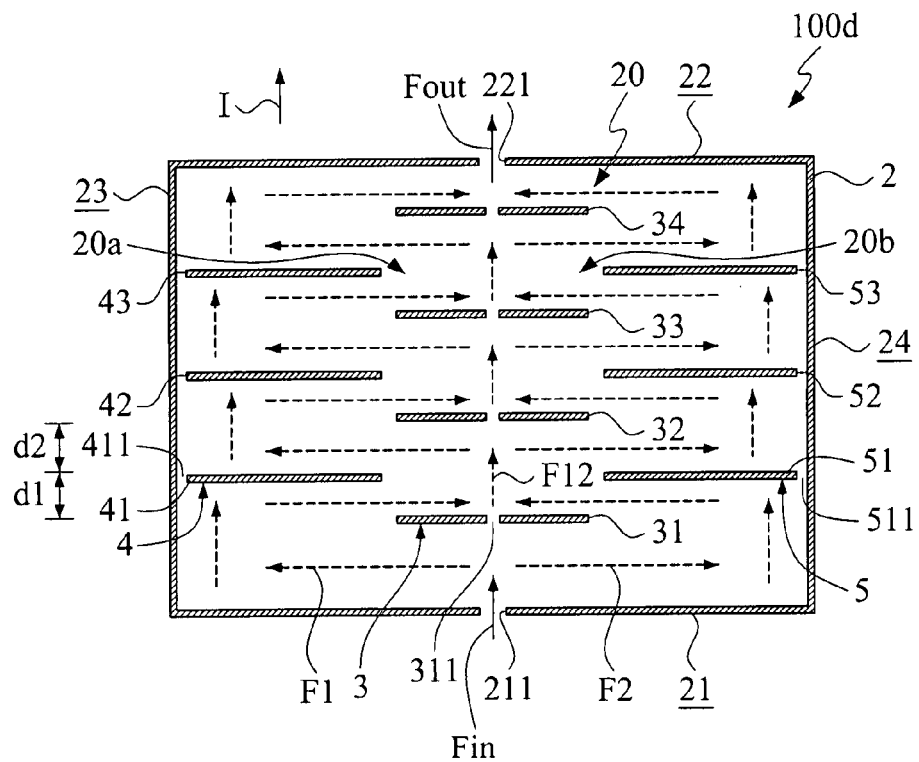
FIG. 8 is a schematic view of a flow field plate module for a fuel cell system according to a fourth embodiment of the present invention.

FIG. 8 shows a flow field plate 100d for a fuel cell system according to a fourth embodiment of the present invention. The fourth embodiment is generally structural similar to the first embodiment. Elements that are the same in the first and the fourth embodiment are denoted with identical reference numerals. The fourth embodiment is different from the first embodiment in that each of the first flow guiding plates in the first flow guide group 3 is provided with an opening extended in the first flowing direction I. For example, the first flow guiding plate 31 is provided with an opening 311 extended in the first flowing direction I. Therefore, when the anode fuel Fin flows to the first flow guiding plate 31, part of the anode fuel Fin directly passes through the opening 311. The fourth embodiment is also different from the first embodiment in that an opening is provided between the side walls 23, 24 and each of the second flow guiding plates in the second flow guide groups 4 and 5, respectively. For example, an opening 411 is formed between the side wall 23 and the flow guiding plate 41; and an opening 511 is formed between the side wall 24 and the flow guiding plate 51. Therefore, when the anode fuel Fin flows to the second flow guiding plates 41, 51, part of the anode fuel Fin directly passes through the opening 411, 511. Moreover, the flow field plate 100, 100a, 100b, 100c in the second and the third embodiment may also be configured as the flow field plate 100d in the fourth embodiment.

Figure 9:
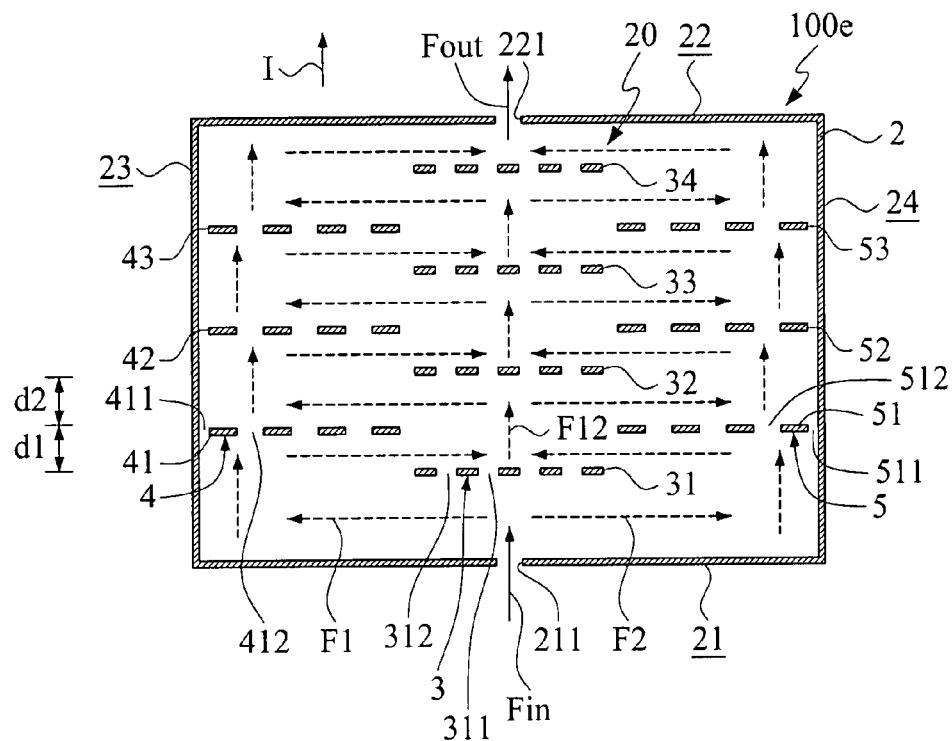
FIG. 9 is a schematic view of a flow field plate module for a fuel cell system according to a fifth embodiment of the present invention.

Please refer to FIG. 9 that shows a flow field plate 100e for a fuel cell system according to a fifth embodiment of the present invention. As shown, the fifth embodiment is generally structurally similar to the fourth embodiment, except for a plurality of openings 311, 312 that are formed on each of the first flow guiding plates in the first flow guide group 3, and a plurality of openings 412, 512 are further formed on each of the second flow guiding plates in the second flow guide groups 4, 5, respectively, besides the opening 411 formed between the side wall 23 and the flow guiding plate 41 and the opening 511 between the side wall 24 and the flow guiding plate 51. Again, the flow field plate 100, 100a, 100b, 100c in the second and the third embodiment may also be configured as the flow field plate 100e in the fifth embodiment.

Figure 10:
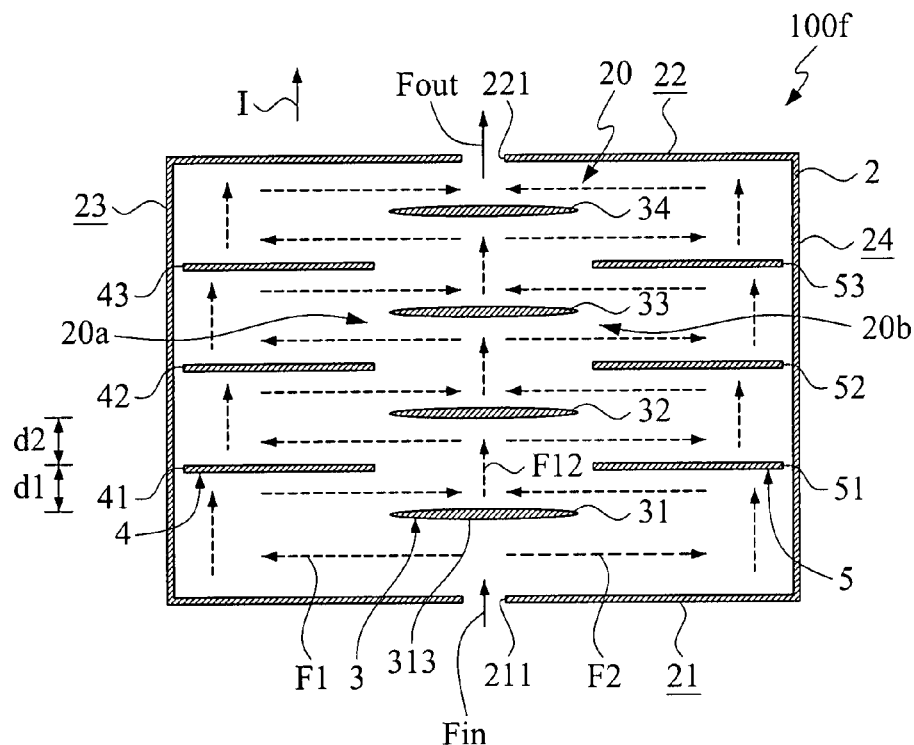
FIG. 10 is a schematic view of a flow field plate module for a fuel cell system according to a sixth embodiment of the present invention.

FIG. 10 shows a flow field plate 100f for a fuel cell system according to a sixth embodiment of the present invention. As shown, the sixth embodiment is generally structurally similar to the first embodiment, except that each of the flow guiding plates in the first flow guide group 3 is provided on one side facing against the first flowing direction I with an arc-curved surface 313 to further reduce the flow resistance of the fuel flowing through the first flow guiding plates.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A flow field plate module for a fuel cell system comprising at least a flow field plate, the flow field plate comprising:
a main body having a fuel-in wall provided with a fuel inlet, a fuel-out wall provided with a fuel outlet, and two corresponding side walls, which together defining a fuel transporting channel in the main body; the fuel transporting channel being divided into a middle converging zone and two diverging zones separately located at two lateral sides of the middle converging zone; the fuel inlet and the fuel outlet being provided in the middle converging zone for introducing a fuel into the fuel transporting channel via the fuel inlet flows in a first flowing direction before being discharged from the main body via the fuel outlet;
a first flow guide group including a plurality of first flow guiding plates arranged in the middle converging zone to space from one another in the first flowing direction; and
two second flow guide groups arranged in the two diverging zones at two opposite sides of the first flow guide group; each of the second flow guide groups including at least one second flow guiding plate; each of the second flow guiding plates being directed at an inner end toward a space between two adjacent first flow guiding plates in the middle converging zone to thereby offset from each of the two adjacent first flow guiding plates by a predetermined distance, allowing a fluid path to be formed between any two adjacent first and second flow guiding plates;
wherein when the fuel is introduced into the fuel transporting channel via the fuel inlet, the fuel is repeatedly guided by the first flow guiding plates toward the two diverging zones to form two branch flows, which are then guided by the second flow guiding plates to flow toward the middle converging zone via the offset distance and form a main flow again; and the diverging and converging of the fuel repeats until the fuel is finally guided to the fuel outlet and discharged from the main body.

2. The flow field plate module for a fuel cell system as claimed in claim 1, wherein each of the second flow guiding plates has a lengthwise direction perpendicular to the first flowing direction, and each of the first flow guiding plates has a lengthwise direction perpendicular to the first flowing direction.

3. The flow field plate module for a fuel cell system as claimed in claim 1, wherein each of the second flow guide groups comprises a plurality of second flow guiding plates, which are separately arranged in the two diverging zones to space from one another in the first flowing direction.

4. The flow field plate module for a fuel cell system as claimed in claim 1, wherein the first and the second flow guiding plates are in the form of flat partition plates.

5. The flow field plate module for a fuel cell system as claimed in claim 4, wherein each of the flat partition plates is provided with at least one opening extended in the first flowing direction.

6. The flow field plate module for a fuel cell system as claimed in claim 4, wherein each of the flat partition plates is provided at one side facing against the first flowing direction with an arc-curved surface.

7. The flow field plate module for a fuel cell system as claimed in claim 1, wherein the second flow guiding plates are connected at respective outer end to a corresponding one of the two side walls.

8. The flow field plate module for a fuel cell system as claimed in claim 1, wherein each of the second flow guiding plates has an outer end spaced from a corresponding one of the two side walls to form an opening between the second flow guiding plate and the side wall.

9. The flow field plate module for a fuel cell system as claimed in claim 1, wherein the fuel cell is a direct methanol fuel cell (DMFC), and the fuel is a methanol-water solution.

10. The flow field plate module for a fuel cell system as claimed in claim 1, wherein the flow field plate is an anode flow field plate.

11. The flow field plate module for a fuel cell system as claimed in claim 1, further comprising an integrated flow field plate internally defining a common fuel transporting channel and provided with a common fuel inlet and a common fuel outlet; the common fuel transporting channel including a fuel-in path and a fuel-out path; and wherein the fuel cell flow field module comprises a plurality of the flow field plates, which are arranged side by side inside the integrated flow field plate with the fuel inlets and the fuel outlets of the plurality of flow field plates being in communication with the fuel-in path and the fuel-out path, respectively.

* * * * *